Sept. 2, 1969 J. M. H. TIEFENTHAL ET AL 3,464,331

APPARATUS FOR COMPOSING PRINT

Filed Jan. 11, 1967 4 Sheets-Sheet 1

Sept. 2, 1969 J. M. H. TIEFENTHAL ET AL 3,464,331

APPARATUS FOR COMPOSING PRINT

Filed Jan. 11, 1967 4 Sheets-Sheet 4

United States Patent Office 3,464,331

Patented Sept. 2, 1969

3,464,331
APPARATUS FOR COMPOSING PRINT

Josef Maria Herbert Tiefenthal, Reigate, and Howard Raymond Baylis, East Grinstead, England, assignors to The Monotype Corporation Limited, London, England, a British company

Filed Jan. 11, 1967, Ser. No. 608,639
Claims priority, application Great Britain, Jan. 13, 1966, 1,732/66
Int. Cl. B41b *13/00, 17/00, 15/00*
U.S. Cl. 95—4.5 7 Claims

ABSTRACT OF THE DISCLOSURE

A photocomposing machine has master character transparencies mounted around the circumference of and distributed between several separately movable discs. Each disc is rotated by an associated stepping motor so that any master character on it may be moved to an exposure position. Whilst one master character on one disc is being exposed to the film those characters next required in the line of print from each of the other discs are being or already have been moved into an exposure position.

The invention relates to apparatus for composing print.

The invention provides, apparatus for composing print which apparatus comprises a plurality of master characters each movable selectively into an operating position, and means for operating on each master character when in an operating position to build up a succession of corresponding characters in a line of characters, which master characters are mounted on a plurality of separately movable members so that while one master character is in an operating position another master character on a different support may be moved simultaneously to an operating position.

The invention also provides photocomposing apparatus for composing print which apparatus comprises a plurality of members bearing master characters, each member being separately movable to bring selected master characters into an operating position, illuminating means for projecting successively images of selected master characters when in an operating position onto a light sensitive member to build up a line of exposed characters and means for selectively switching the illuminating means so as to select any one of the members for use in projecting an image onto the said light sensitive member, each member being movable to bring any one master character on it into an operating position at the same time as the image of another master character on a different support is being projected.

Preferably the illuminating means comprises a plurality of light sources each one associated respectively with one member. Preferably each member bears an array of master characters and is movable to bring any selected one of the master characters on it into an optical path between the light source for that array and the said light sensitive member. Preferably each member comprises a rotatably mounted disc with the master characters disposed around the circle so that the characters successively pass the light source as the disc is rotated. Preferably each member is driven by a motor in stepwise fashion so that each movement of the member is a discrete step or a number of discrete steps equal to or a multiple of the distance between adjacent master characters on the member.

Preferably the motor is a stepping motor.

Some specific embodiments of the invention will now be described by way of example and with reference to the accompanying drawings in which.

Figure 1:
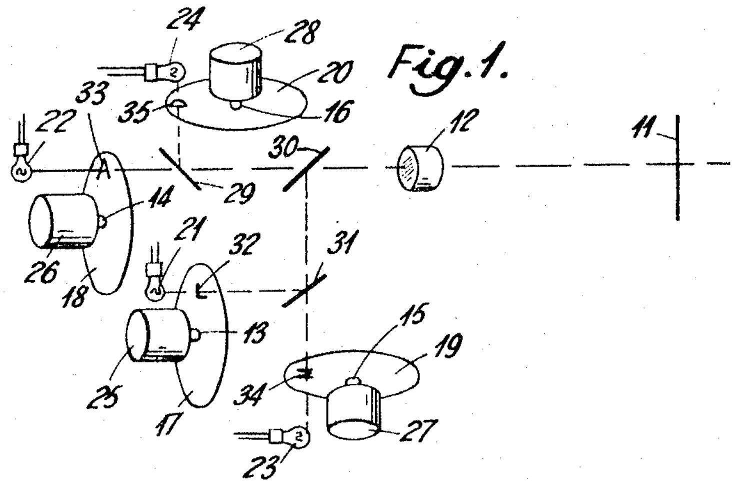
FIGURE 1 shows diagrammatically the optical part of a photocomposing machine.

In the example illustrated in FIGURE 1, a plurality of master characters are arranged so that the images of a succession of selected master characters may be optically projected onto a light sensitive member, in the form of a photographic film, to build up an exposed line of print on the film.

Transparent master characters representing letters of the alphabet, numerals, punctuation, symbols, etc. (of which only the particular four characters 32, 33, 34, 35 are shown in the drawing), are arranged annularly on four opaque discs 17, 18, 19, 20. The discs are concentric with and rigidly connected to driving shafts 13, 14, 15, 16 of the stepping motors 25, 26, 27, 28, respectively. Lamps 21, 22, 23, 24 which may be electric light bulbs or xenon flash tubes are provided to selectively illuminate one master character on each disc when the character on the disc is in an operating position, that is a position in the optical path between the lamp and a photographic film 11, so that the image of the character can be projected onto the photographic film 11. The master characters 32, 33, 34 and 35 are each shown in the drawing in their operating positions. Semisilvered mirrors 29, 30 and 31 are arranged at 45° to the optical paths passing through them so as to transmit or reflect the images of the master characters through a projection lens 12 into the photographic film 11. The semisilvered mirrors transmit and reflect equal amounts of light. Images from the disc 17 are stepping motors arranged to rotate the discs 17, 18, 11. Images from the disc 18 are transmitted by both mirrors 29 and 30 to reach the film 11. Images from the disc 19 are transmitted by the mirror 31 and reflected by the mirror 30 to reach the film 11. Images from the disc 20 are reflected by the mirror 29 and transmitted by the mirror 30 to reach the film 11. The motors 25, 26, 27, 28 are stepping motors arranged to rotate the discs 17, 18, 19 and 20 in discrete steps and may be stepping motors of the type in which a magnetically polarised rotor, which is attached to the driving shaft, is rotated by the resultant magnetic field produced by the windings of a stator. The stator includes a plurality of windings through which a variable magnitude current may be passed in either direction so that the resultant magnetic field of the stator windings may be rotated in discrete steps and may stop in one of these steps as required thereby causing the rotor to move in discrete steps and take up a required rotational position. The stepping motors may, for example, be as described in our copending British patent application No. 10,651/66, and may be controlled by control apparatus substantially as described in that patent application.

The motors 25, 26, 27 and 28 are controlled by signals on a magnetic or punched paper tape to move independently of each other. In each motor the armature may move clockwise or anticlockwise depending on the energisation of the field windings and be held firmly at rest in any desired position. In this embodiment each of the discs 17, 18, 19, 20 carries a quarter of the total required master characters, the more frequently used lower case letters (for example "e," "t," "a," "i," "n," etc.), being evenly divided between the four discs.

Figure 3:
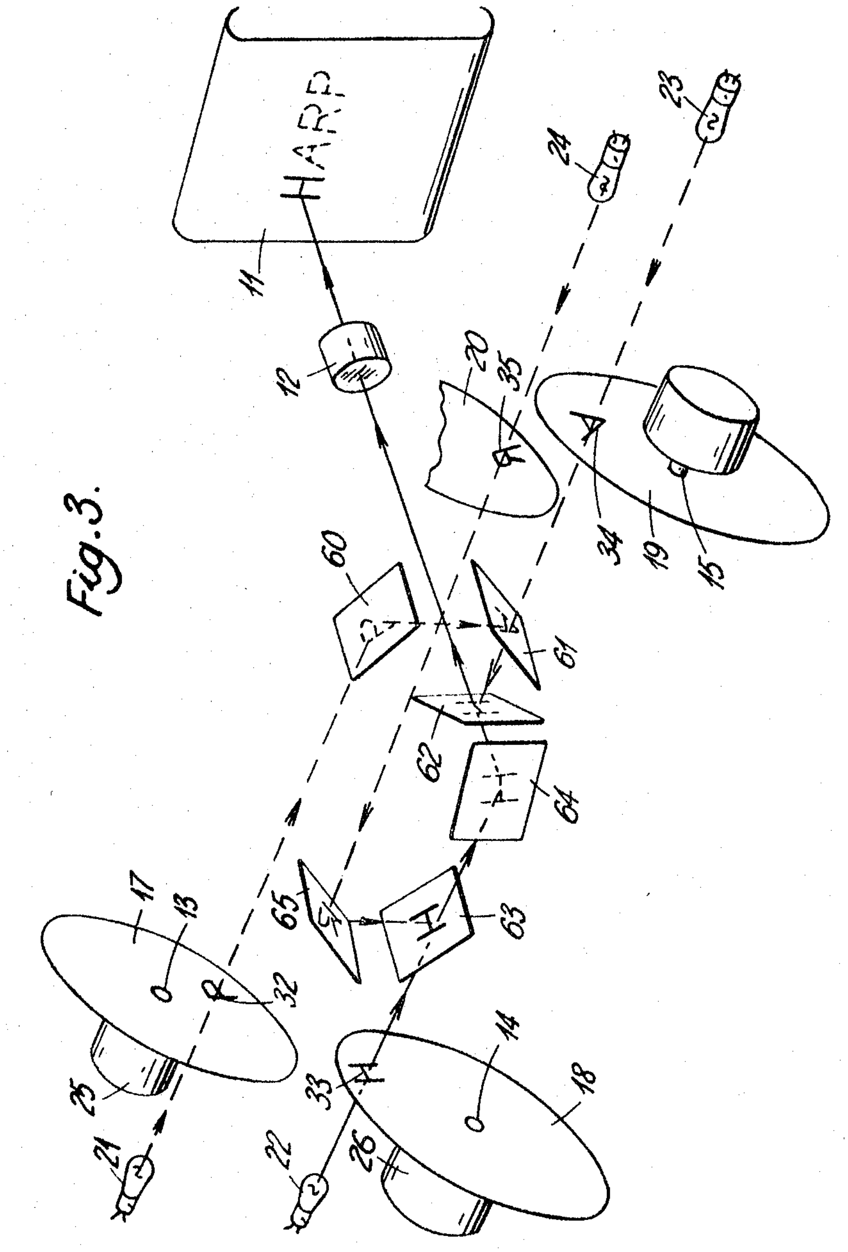
FIGURE 3 shows diagrammatically an alternative arrangement of the optical part of a photocomposing machine.
Figure 4:
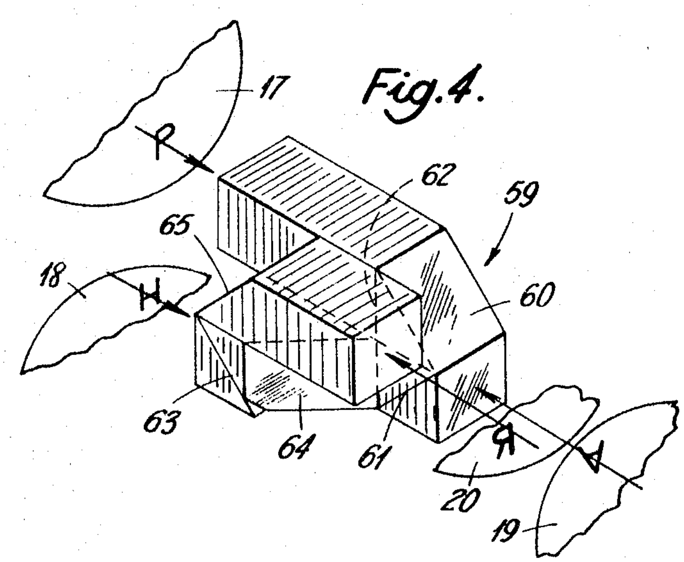
FIGURES 4 and 5 show two views of part of the apparatus shown diagrammatically in FIGURE 3.
Figure 5:
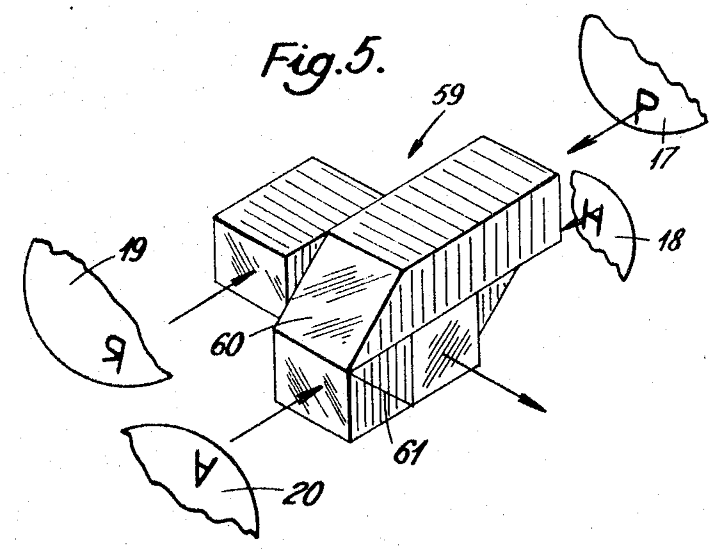

An alternative arrangement of the optical part of a photocomposing machine is shown in FIGURES 3, 4 and 5. In this case the discs 17–20 are arranged in two pairs, the discs of each pair being arranged side by side and the pairs of disc facing one another as shown in FIGURE 3. The three mirrors 29, 30 and 31 of FIGURE 1 are replaced by silvered and semisilvered surfaces in the arrangement of glass blocks which are cemented together to form a single glass block 59 (shown in FIGURES 4 and 5).

Images of the characters selectively exposed on the disc 17 are reflected at the mirror surface 60 and reflected at the semisilvered mirror surfaces 62 and 62 and is then passed through the lens 12 onto the film 11.

Images from the disc 18 are transmitted through semisilvered surface 63 reflected at mirror surface 64 and transmitted through semisilvered surface 62 to the lens 12 as shown for the character H in FIGURE 3. Images from the disc 19 are transmitted through the semisilvered surface 61 and reflected at the semisilvered surface 62 onto the lens 12. Images from the disc 20 are reflected by mirror surface 65, semisilvered surface 63, and mirror surface 64 and transmitted through semi-silvered surface 62.

The mode of operation of the embodiments of FIGURES 1, 3, 4 and 5 is as follows. The lamps 21, 22, 23 and 24 are adjusted to the same brilliancy. A keyboard operated machine is used to record onto a tape 40 the necessary signals to control the photocomposing apparatus. These signals indicate the required sequence of letters or numbers together with the appropriate spacing for justification.

Figure 6:
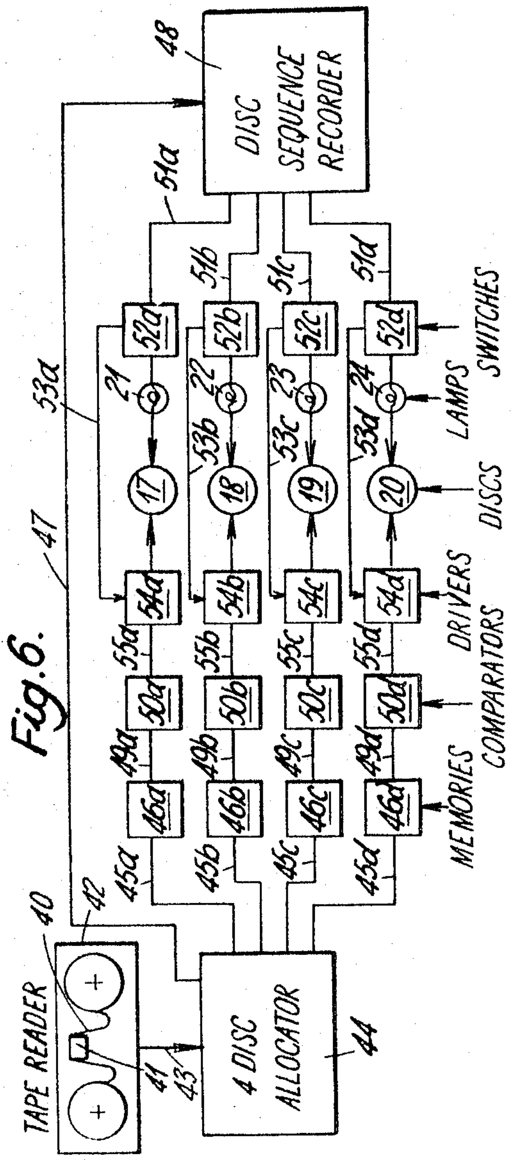
FIGURE 6 shows a block diagram of the control apparatus for the apparatus of FIGURES 1 and 3.

These signals are read from a tape 40 (FIGURE 6) by a read-off head 41 of a tape reader 42. The signals pass along a line 43 to an allocator 44 which by reading part of the signal for the character determines which disc the character is on. It then passes the signal along one of lines 45 to a memory unit 46 associated with that disc. Simultaneously a signal is sent along line 47 to a disc sequence recorder 48.

The signal for each character is sent from the memory unit 46 along a line 49 to an associated comparator 50 which calculates the extent and direction of the rotation of the associated disc required to move the character on that disc corresponding to that signal into the position in which it may be illuminated. The comparator 50 controls drivers 54 along line 55. No movement of the disc occurs, however, until the previous required character on that disc has been illuminated.

The disc sequence recorder 48 determines the sequence in which the lamps 21–24 are to be switched on so as to illuminate the master characters in the correct order to build up a line of exposed print. When the required disc is in the correct position the disc sequence recorder 48 passes a signal along line 51 to a switch 52 which flashes the associated lamp (21–24). At the same time as the signal is passed along line 51, another signal is passed along line 53 to the driver 54 of the disc on which the master character has just been illuminated. This latter signal when received by the driver causes this disc to rotate into the position required for the next character from that disc to be illuminated. Thus the images of the various required master characters are sequentially exposed onto the film 11 by sequentially switching on the particular lamp associated with the next required character as soon as the previous exposure has finished and the next required master character is in its operating position. After the required exposure time for each character, the lamp associated with the last exposed character is switched off. The film 11 is moved or alternatively the optical path between the mirrors and the film 11 is deflected by a mirror arrangement, such as for instance that shown in FIGURE 1 of British patent specification No. 852,991 between successive exposures to allow the character images to build up a line or lines of print. By using master characters arranged on a plurality of separately movable discs, the speed of photocomposing may be increased. Provided that the next character required in composition is not on the same disc, it is not necessary to wait after each exposure for the next required master character on that disc to be moved to its operating position before the next exposure can occur. Later required master characters or other discs may be moved into their operating positions while an earlier required character is still being exposed. For instance, as soon as one master character on one disc has been exposed the lamp associated with that disc is switched off and the control unit of the stepping motor of that disc searches the incoming signals to find the next character required on that disc and to move the disc accordingly. In many cases as soon as that one exposure is finished and the film 11 has moved along one position or the optical path been deflected, the next exposure may take place immediately as the next required master character, being on a different disc, has been moved to its operating position while the previous exposure was occurring.

Depending on the print being composed, it sometimes occurs that two successive characters in a line of print occur on the same disc or that two remotely separated characters on one appear too closely together in a line of print. In these cases a delay between successive exposures may occur while the next required master character is moved to its operating position. This delay does not occur when the same character is to be exposed twice in succession.

In this way, the operation of the apparatus will include periods of relatively higher speed of operation while successive characters occur on different discs.

Figure 2:
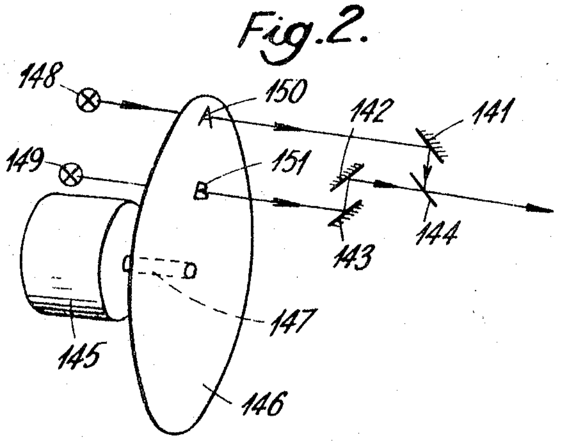
FIGURE 2 shows an alternative form of part of the apparatus shown in FIGURE 1.

In the alternative form of the part of the apparatus shown in FIGURE 2, a stepping motor 145 similar to 25, 26, 27, 28 of FIGURE 1 drives a disc 146 through a drive shaft 147 in a manner similar to the embodiment of FIGURE 1. The disc 146 contains two sets of master characters arranged in annuli at different radii and concentric with the drive shaft 147, one master character from each set 150 and 151 being shown as examples. These master characters 150 and 151 are illuminated when in their operating positions by lamps 148 and 149 respectively. Mirrors 141, 142, 143 are provided together with semisilvered mirror 144 and are positioned so that the optical paths from both master characters 150 and 151 to the mirror 144 are substantially equal in length.

The mode of operation of this alternative motor and disc arrangement shown in FIGURE 2, is generally similar to that described with reference to FIGURE 1 except that either of the master characters 150 or 151 may be projected onto the film 11 by selectively switching on either of the lamps 148 or 149. The image of master character 150 when projected is reflected at mirrors 141 and 144 whereas the image of master character 151 when projected is reflected by mirrors 143 and 142 and transmitted by mirror 144. In both cases the image of the master character is then passed to one of the mirrors 29 or 31 in the optical system of FIGURE 1.

The invention is not restricted to the details of the foregoing examples. For instance, any number of discs and lamps may be used or alternatively the master characters may be arranged on drums rather than discs as described above. If drums are used, each drum may have an associated lamp inside the drum or alternatively arranged externally. More than one row of transparent characters may be arranged around each drum.

We claim:

1. Apparatus for composing print, comprising: a plurality of independently movable character carriers; a row of master characters on each independently movable character carrier; independently operable means associated with each character carrier adapted to move any master character on the character carrier into an operating position; and means for operating on each master character when in its operating position to build up a succession of corresponding characters in a line of characters, the moving means being independently and simultaneously operable so that while one master character on one character carrier is stationary in the operating position, another master character on a different character carrier may be moved simultaneously by its associated moving means to its operating position.

2. Photocomposing apparatus for composing print on a light sensitive member comprising:

a plurality of character carriers;

an array of master characters on each character carrier;

means associated with each character carrier for separately moving any master character on the character carrier into an operating position in an optical path between the illuminating means and the light sensitive member;

means for illuminating the master character on each character carrier which is in the operative position;

means for projecting the image of the illuminated master character on to the light sensitive member;

means to selectively align the light sensitive member with each illuminated master character to build up a line of exposed characters thereon;

means for selectively energizing each of the illuminating means; and means for selectively operating the means associated with each respective character carrier for separately moving master characters thereon into an operating position simultaneously with the illumination of a master character on another character carrier.

3. Photocomposing apparatus as claimed in claim 2 wherein the means for illuminating the master character which is in the operative position comprises a plurality of light sources, each of which is associated respectively with one character carrier.

4. Photocomposing apparatus as claimed in claim 3 wherein each carrier is comprised of a rotatably mounted disc with the master characters disposed in a circle so that the characters successively pass the light source as the disc is rotated.

5. Photocomposing apparatus as claimed in claim 2 wherein the moving means for each carrier comprises a motor arranged to drive the carrier in stepwise fashion so that each movement of the carrier is a discrete step equal to a multiple of the distance between adjacent master characters on the carrier.

6. Photocomposing apparatus as claimed in claim 2 wherein the moving means for each carrier comprises a stepping motor arranged to drive the carrier in stepwise fashion whereby each movement of the carrier is a discrete step equal to a multiple of the distance between adjacent master characters on the carrier.

7. Photocomposing apparatus as claimed in claim 4 wherein the character carriers are comprised of four separate character carrying discs, the discs being arranged in two pairs spaced apart facing each other; the plurality of light sources are comprised of four lights each associated with a respective disc; the means for separately moving the master characters are four stepping motors each having one character carrying disc mounted at its output shaft; and the means for projecting the image of the illuminated master carrier are multi surface reflecting means positioned between the two pairs of discs arranged so that character images transmitted by any one of the discs are deflected along a common path parallel to the plane of the discs.

References Cited

UNITED STATES PATENTS

| | | | |
|---|---|---|---|
| 2,653,526 | 9/1953 | Peery | 95—4.5 |
| 2,985,064 | 5/1961 | Dimmick | 95—4.5 XR |
| 3,099,945 | 8/1963 | O'Brien | 95—4.5 |
| 3,291,015 | 12/1966 | Moyroud | 95—4.5 |

JOHN M. HORAN, Primary Examiner

LEO H. McCORMICK, Jr., Assistant Examiner